United States Patent Office 3,466,506
Patented Sept. 9, 1969

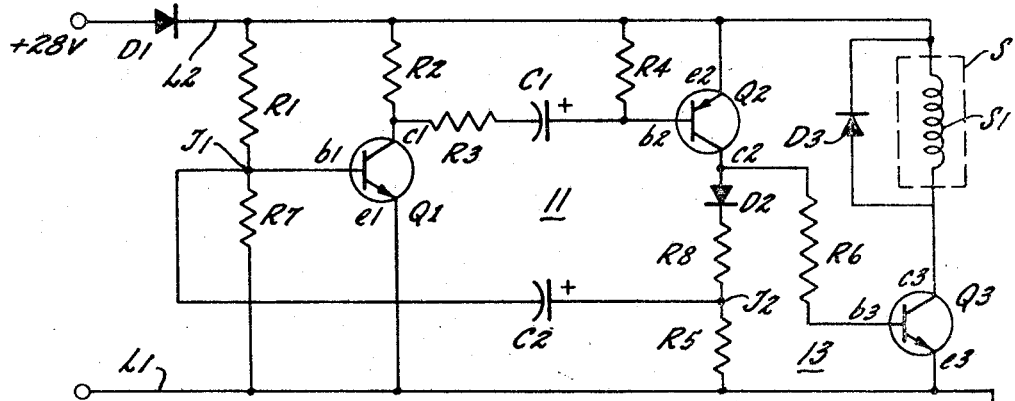
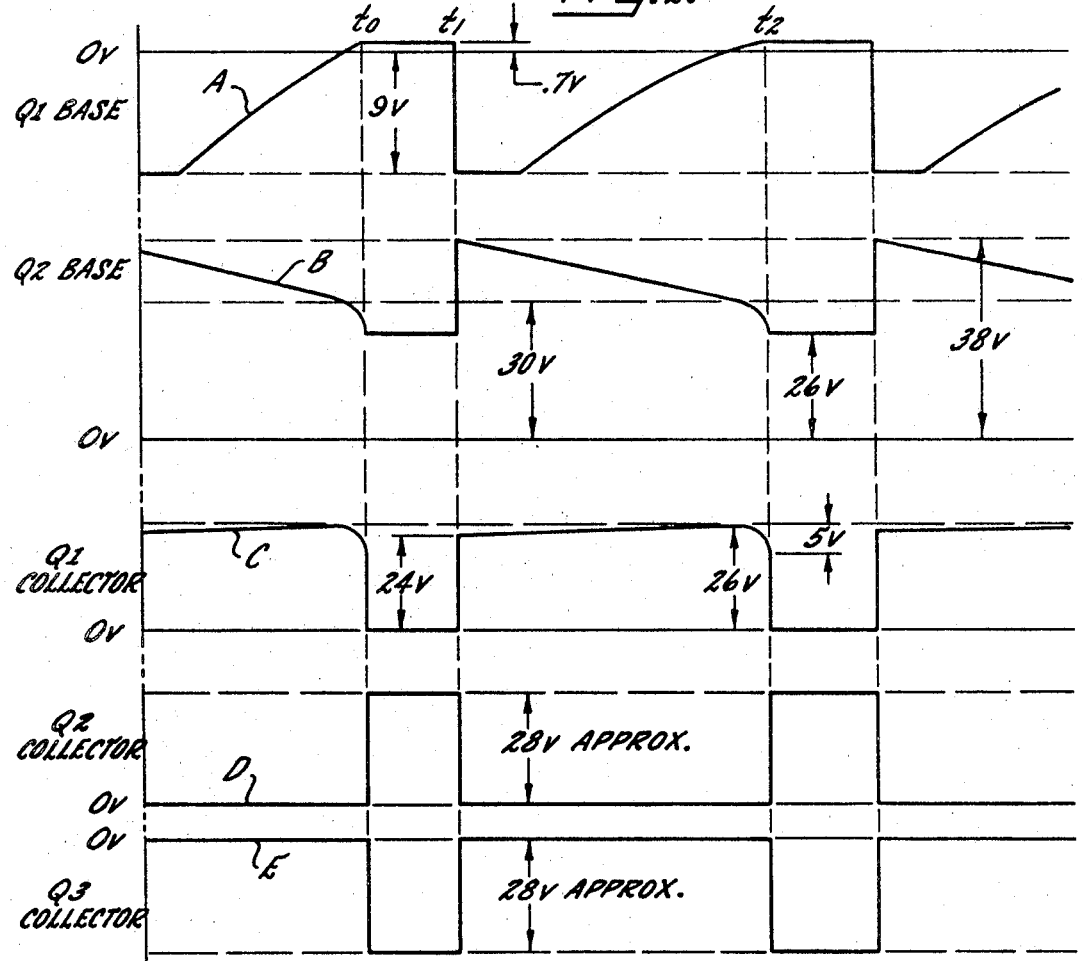

3,466,506
PULSE GENERATOR FOR PERIODICALLY
ENERGIZING A TIMER SOLENOID
Matthew Badovinac, Arlington Heights, and Frank P.
Broviak, Mundelein, Ill., assignors to General Time
Corporation, Stamford, Conn., a corporation of Delaware
Filed May 3, 1967, Ser. No. 635,752
Int. Cl. H01h 47/18, 47/32; H03k 17/00
U.S. Cl. 317—142                                    5 Claims

ABSTRACT OF THE DISCLOSURE

A free-running multivibrator using complementary transistors with the output of each connected to the input of the other through separate capacitors which cause the transistors to conduct for brief, regularly time-spaced periods. The resulting pulses are current-amplified by a third transistor which drives the solenoid of an elapsed time indicator.

Background of the invention

The present invention relates to elapsed time indicators of the type wherein electrical pulses periodically energize a solenoid so as to step the ratchet wheel of an elapsed time indicating mechanism as disclosed in Schimpf Patent No. 3,229,225. More particularly, the invention relates to an improved pulse generator for such a timer.

Elapsed time indicators of the above type operate on the principle of telling time by counting pulses. Such a timer is only as accurate as the pulse repetition frequency of the pulse generator used to drive it. One problem solved by the pulse generator disclosed in the Schimpf patent was the tendency of prior art circuits to vary in pulse repetition frequency with variations in temperature. In the Schimpf pulse generator this problem is overcome by employing a temperature compensation network.

An important object of the present invention is to provide an elapsed time indicator of the above type which will retain its accuracy within acceptable limits over a wide range of temperature without the use of a special temperature compensating network. Closely related to the foregoing object is the more specific object of providing an improved pulse generator for driving the solenoid of an elapsed time indicator of the above type which will remain within prescribed limits both as to the pulse length and pulse repetition frequency over a wide temperature range—as much as $-55°$ C. to $+135°$ C.

Another related object of the invention is to provide a pulse generator wherein the pulse duration and the pulse repetition frequency may be varied separately so that if either of the above characteristics of a particular unit is observed to drift during calibration, it may be brought within limits without thereby disturbing the other of the characteristics.

Brief description of the drawings

Other objects and advantages will become apparent from the following description and from the accompanying drawings in which:

FIGURE 1 is a schematic diagram of a preferred circuit incorporating the invention, and FIG. 2 is a series of waveforms showing voltages at different points in the circuit of FIG. 1.

While the invention has been susceptible of various modifications and alternative forms, a specific embodiment thereof has been shown by way of example in the drawings which will herein be described in detail. It should be understood, however, that it is not intended to limit the invention to the particular form disclosed but, on the contrary, the intention is to cover all modifications, equivalents, and alternatives falling within the spirit and scope of the invention.

Description of the preferred embodiment

Referring more particularly to the drawings, the preferred circuit illustrated in FIG. 1 includes (1) a free-running multivibrator 11 comprising two transistors Q1 and Q2 of opposite conductivity types, and (2) an output circuit 13 for driving the solenoid S of an elapsed time indicator (not shown) and principally comprising the transistor Q3 having a collector-emitter circuit connected in series with the winding S1 of the solenoid S. The series combination of the winding S1 and transistor Q3 is connected through a pair of leads L1 and L2 to the outputs of a direct current source through a protective diode D1. In a typical commercial embodiment of the circuit to be described, the positive terminal of the current source is at a potential of $+28$ volts above the other output terminal which is connected through the lead L1 to a point of reference potential, here shown as ground.

Also in the commercial version of the circuit to be described, the first transistor Q1 is of the NPN conductivity type and has its emitter connected directly to the grounded lead L1 and its collector connected through a resistor R2 to the positive lead L2. The second transistor Q2 is of the PNP type with its emitter connected directly to the positive lead L2 and its collector connected to the ground lead L1 through a diode D2 and a pair of resistors R8 and R5. The function of the diode D2 in the circuit will appear as this description proceeds.

In carrying out the invention, means are provided for normally maintaining the transistors Q1 in conduction and for this purpose a pair of resistors R1 and R7 are connected in series with one another between the leads L1 and L2, with the junction point J1 of the resistors being connected to the base $b1$ of the transistor Q1. The resistors R1 and R7 are so proportioned as to provide sufficient drive to the base of transistor Q1 to cause it to saturate.

In accordance with an important feature of the invention, means are also provided for causing the second transistor Q2 to be made conductive when the first transistor Q1 conducts, and to maintain the transistor Q2 conductive for a desired time period representing the pulse length produced by the multivibrator 11. In carrying out this aspect of the invention, the collector $c1$ of the transistor Q1 is connected to the base $b2$ of the transistor Q2 through a resistor R3 and a capacitor C1 is connected in series with one another. Consequently, when power is first applied to the circuit and the transistor Q1 is turned on, its collector $c1$ is quickly pulled down to near ground level (see waveform D at time $t_0$, FIG. 2) and this negative-going voltage change is transmitted through the resistor R3 and the capacitor C1 to the base $b2$ of the transistor Q2 (waveform A). The transistor Q2 is normally non-conducting, by virtue of a biasing resistor R4 connecting its base $b2$ to the line L2, and maintaining the base at the same potential as the emitter $e2$. The sudden negative-going voltage caused by the turning on of transistor Q1 applies a forward bias to the base-emitter junction of transistor Q2, thereby causing that transistor to turn on and conduct as well.

The time during which the transistors Q1 and Q2 continue to conduct is determined by the values of the capacitor C1 and the resistors R3 and R4 through which the capacitor is discharged and charged from the moment that the transistor Q1 begins to conduct. When the collector of Q1 is switched to ground, C1 discharges rapidly through R3 to ground. As a result a charging current flows through R4, making the base of Q2 negative with respect to the emitter, causing Q2 to conduct. The time period during which the above occurs is shown in FIG.

2 to begin and end at the instants $t_0$ and $t_1$ respectively. Thus at time $t_1$, when the capacitor C1 has received a predetermined amount of charge, there is insufficient current supplied to the base $b2$ to maintain the transistor Q2 in conduction and at that instant the transistor Q2 is shut off.

In further keeping with the invention, means are provided to shut off the transistor Q1 substantially at the same time that transistor Q2 ceases to conduct. For this purpose, the junction point J2 of the resistors R5 and R8 in the output circuit of the transistor Q2 is connected to the base $b1$ of the transistor Q1 through a second capacitor C2. Consequently, when the transistor Q2 ceases to conduct, the sudden voltage drop at the junction J2 due to interruption of current theretofore flowing through the resistor R5 is transmitted through the capacitor C2 to the base $b1$. The relative values of the resistors R5 and R8 are chosen so that the magnitude of the voltage drop applied to the base $b1$ is sufficient to overcome the normal forward bias applied thereto by the biasing resistors R1 and R7. Thus it may be observed from the waveform A of FIG. 2 that at time $t_1$ when the transistor Q2 ceases to conduct, the voltage at the base $b1$ of the transistor Q1 drops from approximately +.7 volts to about −9 volts.

With the transistor Q1 shut off, its collector $c1$ rises from about 0 volts to approximately 28 volts (waveform C at $t_1$) and this voltage rise is transmitted in a manner similar to that in which the voltage drop was transmitted to the base of transistor Q2 through the resistor R3 and the capacitor C1. This voltage rise at the base $b2$, to about 38 volts about ground, which cuts off the transistor Q2 even further, may also be observed in waveform B of FIG. 2.

The length of time during which the transistors Q1 and Q2 remain non-conducting is determined principally by the value of the capacitor C2 and by the value of the resistor R1 through which the capacitor is discharged. As the capacitor C2 is being discharged through the resistor R1, the base $b1$ of the transistor Q1 gradually rises from approximately −9 volts until it reaches a slightly positive potential at time $t_2$ (waveform A, $t_1$–$t_2$). When the base $b1$ is sufficiently positive, the emitter-base junction of the transistor Q1 is again forward biased and the transistor then begins to conduit. From this point on, the cycle repeats, with the conduction of transistor Q1 bringing about conduction of transistor Q2 almost instantaneously by applying a sudden voltage drop to its base $b2$. In a commercial version of the unit, the pulse repetition frequency was 10 per second and the pulse duration ($t_0$–$t_1$) was approximately 25 milliseconds. Stated differently, the ratio of "on" to "off" was 1 to 3.

The function of the diode D2 will now be more readily understood. While Q2 conducts, a positive charge builds up on the capacitor C2. When Q2 stops conducting, this charge tends to leak away to ground through R5, without the diode, through R8, R6, and Q3. As a result, Q3 would keep conducting even after Q2 had been turned off. Since the diode D2 is poled to conduct from the transistor Q2 to the resistor R8, the diode prevents any positive voltage discharge from passing through resistors R8 and R6 thereby assuring a sharp cut-off of transistor Q3.

To apply a driving current to the solenoid winding S1 during the time periods in which the transistors Q1 and Q2 conduct, the collector of transistor Q2 is connected through a coupling resistor R6 to the base $b3$ of the transistor Q3. Transistor Q3 is of a conductivity type opposite to that of transistor Q2; in this instance it is an NPN transistor and its base-emitter junction is forward biased whenever the transistor Q2 conducts, since it is during these conducting periods of the transistor Q2 that its collector $c2$ is at a substantial positive potential.

Thus, between times $t_0$ and $t_1$ during which the transistors Q1 and Q2 conduct, current is driven through the solenoid coil S1. In order to prevent damage to the driving transistor Q3 by the high voltage which is developed across the winding S1 by collapsing flux when the transistor Q3 ceases to conduct, a diode D3 is connected across the winding in such a direction as to provide a low resistance path for this high voltage to the +28 volt line.

The circuit constructed in accordance with the invention as illustrated in FIG. 1 is temperature stable without special temperature compensating networks, principally due to the resistor R7 connected across the base-emitter junction of the transistor Q1. The resistor R7 acts as a shunt and limits the effect of any increase in the base-emitter current which results with an increase in ambient temperature. If during a temperature test, it is found that the pulse repetition frequency of the pulse generator comprising the transistors Q1 and Q2 has drifted near one of the prescribed limits for such frequency, an appropriate adjustment may be made by varying the value of the capacitor C2 or of the resistor R1. Similarly, if during such a test it is detected that the duration of the current pulse driven through the winding S1 is drifting near one of the limits set for that criterion, this characteristic too may be brought back within acceptable limits by changing the value of the capacitor C1 or of the resistor R3 without upsetting the pulse repetition frequency of the device.

From the foregoing, it may be seen that there is provided a simple device for driving a solenoid with current pulses of a prescribed duration and at a desired repetition frequency over a wide temperature range with good temperature stability, yet requiring no special temperature compensating networks. Further, changes in either pulse duration or pulse repetition frequency may be individually overcome by changing the values of separate components in the circuit, thus permitting changing of one of the characteristics without thereby altering the other of the characteristics to the point where it falls outside of acceptable limits.

For sake of example the invention has been described and in some instances claimed as a pulse generator having an NPN transistor in the first stage, which is biased normally on and a PNP transistor in the second stage which is biased normally off. It will be understood that an equivalent circuit could be built with a PNP transistor in the first stage and an NPN transistor in the second stage, provided appropriate changes were made in connecting them to the current source, and that this would not depart from the scope of the invention.

We claim as our invention:
1. A pulse generator comprising in combination
 (a) first and second leads for connecting said generator to a source of current,
 (b) a first capacitor,
 (c) a charging path for said capacitor including a first transistor having a control input and a first resistor connected in series circuit with said capacitor across said leads,
 (d) a biasing network connected to said control input for normally maintaining said transistor in conduction,
 (e) a second transistor of a conductivity type opposite to that of said first transistor and having a control input,
 (f) circuit means including a second resistor in series with said second transistor for connecting the latter across said leads,
 (g) means for connecting the control input of said second transistor to said first resistor, said second transistor being made to conduct by a voltage drop across said first resistor caused by charging current through said first transistor while the latter is conductive until said charging current has diminished to a predetermined amount,
 (h) a second capacitor connected between said second transistor and the control input of said first transistor for applying to said control input the sudden voltage drop appearing across said second resistor when said second transistor stops to conduct, causing said first transistor to stop to conduct also, and (i) a resistive discharge path connected between said second capacitor and one of said leads for gradually returning the junction point of said second capacitor and the control input of said first transistor to a level where said transistor can conduct again.

2. The pulse generator as defined in claim 1 further characterized in that the time required to charge the first capacitor to the point where the second transistor ceases to conduct is less than half of the time required to discharge the second capacitor to the point where the first transistor can conduct again.

3. A pulse generator comprising in combination (a) first and second leads for supplying current to said generator from a current source, (b) a first transistor having a base and also having an emitter-collector circuit connected to one of said leads, (c) an output network including at least one resistor for connecting said emitter-collector circuit to the other of said leads, (d) a biasing network connected between said leads and having a junction point connected to said base so as to maintain said transistor normally conducting, (e) a second transistor of a conductivity type opposite to that of said first transistor, said second transistor having a base and also having an emitter-collector circuit connected to said other lead, (f) resistor means connected between said base and said one of said leads, (g) an output network including at least one resistor for connecting the emitter-collector circuit of said second transistor to said one of said leads, (h) a coupling network including a capacitor and a resistor connected in series with one another between the output network of said first transistor and the base of said second transistor so that when said first transistor conducts, the voltage drop across said resistor due to charging current flowing into said capacitor through said resistor means biases said second transistor into conduction, and (i) a second capacitor connected between the output network of said second transistor and the base of said first transistor so that when said second transistor ceases to conduct, the resulting voltage drop across its output network is applied to the base of the first transistor causing it to stop conducting until said second capacitor has become substantially discharged through the biasing network of said first transistor.

4. A pulse generator comprising in combination (a) first and second leads for connecting said generator to a source of direct current, (b) first and second, NPN and PNP, transistors each having an emitter connected to said first and second leads respectively, (c) first and second output networks each including at least one resistor connected between the collectors of said first and second transistors and said second and first leads respectively, (d) a biasing nework connected between said leads and to the base of said first transistor so as to normally maintain said transistor in conduction, (e) a timing circuit comprising a resistor and a capacitor connected in series between the collector of said first transistor and the base of said second transistor so as to cause the second transistor to begin to conduct in response to commencement of conduction in said first transistor, (f) a biasing resistor connected between said second lead and the base of said second transistor to complete a charge path for said capacitor, the value of said resistor being selected to cause said second transistor to be biased into non-conduction after said capacitor has received a predetermined charge, and (g) a second capacitor connected between the output network of the second transistor and the base of said first transistor for causing the first transistor to cease conducting in response to termination of conduction of said second transistor, said first transistor remaining non-conducting until said second capacitor has become substantially discharged through the biasing network of said first transistor.

5. Apparatus energized from a direct current source for producing mechanical motion at regularly recurring intervals comprising in combination (a) first and second leads for supplying direct current to said apparatus from said source, (b) a solenoid having a winding, (c) a transistor for driving said solenoid with current from said source, said transistor having an output circuit connected in series with said solenoid winding between said leads and also having an input circiut, (d) a pulse generator for periodically rendering said driving transistor conductive for predetermined time periods separated by predetermined time intervals, said pulse generator including (1) a pair of transistors of opposite conductivity types, each having an emitter-collector circuit connected through individual output networks to said leads, and also having a base, (2) first and second biasing networks, each connected to the base of a respective one of said transistors and to at least one of said output leads for normally maintaining said first transistor in conduction and said second transistor in non-conduction, (3) a first coupling circuit comprising a resistor and a capacitor connected in series between the output network of said first transistor and the base of said second transistor so as to cause said second transistor to conduct for said predetermined time period in response to conduction by said first transistor, (4) a second coupling circuit including a second capacitor connected between the output network of said second transistor and the base of said first transistor for causing said first transistor to stop conducting in response to termination of conduction by said second transistor, said first transistor remaining non-conducting for one of said predetermined time intervals until said second capacitor has become substantially discharged through the biasing network of said first transistor, and (5) means for connecting the output network of said second transistor to the input circuit of said solenoid driving transistor.

References Cited

UNITED STATES PATENTS

| | | | |
|---|---|---|---|
| 3,069,552 | 12/1962 | Thomson | 307—288 XR |
| 3,178,609 | 4/1965 | Skirvin | 331—111 XR |
| 3,210,613 | 10/1965 | Prapis | 317—142 |
| 3,246,209 | 4/1966 | Multari et al. | 317—142 |
| 3,292,005 | 12/1966 | Lee | 307—255 |
| 3,306,030 | 2/1967 | Wiley | 331—111 XR |
| 3,378,693 | 4/1968 | Schmidt | 331—111 XR |
| 3,408,539 | 10/1968 | Legg et al. | 317—142 XR |
| 3,409,786 | 11/1968 | Nemeth | 307—288 XR |

JOHN F. COUCH, Primary Examiner

W. M. SHOOP, Jr., Assistant Examiner

U.S. Cl. X.R.

307—255, 288; 317—148.5; 331—111